(12) United States Patent
Taherzadeh Boroujeni et al.

(10) Patent No.: US 12,526,848 B2
(45) Date of Patent: Jan. 13, 2026

(54) LINKAGE OF Msg3 REPETITION REQUEST AND Msg4 PUCCH REPETITION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 442 days.

(21) Appl. No.: 17/662,628

(22) Filed: May 9, 2022

(65) Prior Publication Data

US 2023/0057352 A1    Feb. 23, 2023

Related U.S. Application Data

(60) Provisional application No. 63/235,042, filed on Aug. 19, 2021.

(51) Int. Cl.
| | |
|---|---|
| *H04W 74/0833* | (2024.01) |
| *H04L 5/00* | (2006.01) |
| *H04W 72/1263* | (2023.01) |
| *H04W 74/08* | (2024.01) |
| *H04W 76/10* | (2018.01) |

(52) U.S. Cl.
CPC ....... *H04W 74/0841* (2013.01); *H04L 5/0053* (2013.01); *H04W 72/1263* (2013.01); *H04W 74/0866* (2013.01); *H04W 76/10* (2018.02)

(58) Field of Classification Search
CPC ......... H04W 74/0841; H04W 72/1263; H04W 74/0866; H04W 76/10; H04W 74/004; H04L 5/0053
See application file for complete search history.

(56) References Cited

U.S. PATENT DOCUMENTS

| | | | |
|---|---|---|---|
| 2018/0070278 A1* | 3/2018 | Uemura | H04W 48/00 |
| 2021/0251016 A1 | 8/2021 | Xiong et al. | |
| 2022/0377798 A1* | 11/2022 | Chien | H04W 74/0833 |

(Continued)

OTHER PUBLICATIONS

International Search Report and Written Opinion—PCT/US2022/039415—ISA/EPO—Oct. 19, 2022.

(Continued)

*Primary Examiner* — Jung H Park
(74) *Attorney, Agent, or Firm* — Procopio, Cory, Hargreaves & Savitch LLP

(57) ABSTRACT

Method and apparatus to link a Msg4 PUCCH coverage enhancement and a Msg3 repetition request. The apparatus transmits a PRACH to initiate a RACH procedure, the PRACH including a request for a first coverage enhancement associated with the RACH procedure. The request includes information related to at least a second coverage enhancement associated with an acknowledgement associated with the RACH procedure. The apparatus receives a random access response associated with the RACH procedure. The first coverage enhancement may correspond to a repetition request for a RRC connection request message. The second coverage enhancement may correspond to a repetition request for an RRC connection setup message.

26 Claims, 11 Drawing Sheets

(56) References Cited

U.S. PATENT DOCUMENTS

2023/0066772 A1\* 3/2023 Myung ............... H04W 74/004
2023/0090914 A1\* 3/2023 Cha ................... H04W 74/0833
                                                        370/329
2024/0049289 A1\* 2/2024 Ko ...................... H04W 74/004

OTHER PUBLICATIONS

LG Electronics: "Discussion on Coverage Enhancement for Msg3 PUSCH", 3GPP TSG RAN WG1 # 104b-e, R1-2103627, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 202-Apr. 20, 2021, Apr. 7, 2021, 4 Pages, XP052178318, Section 2, p. 1-p. 2.
Qualcomm Inc: "Physical Uplink Control Channels", 3GPP TSG RAN WG1 #83, 3GPP Draft, R1-157024 Physical Uplink Control Channels, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 15, 2015 (Nov. 15, 2015), pp. 1-4, XP051003327, proposal 7, p. 3.

\* cited by examiner

LINKAGE OF Msg3 REPETITION REQUEST AND Msg4 PUCCH REPETITION

CROSS REFERENCE TO RELATED APPLICATION(S)

This application claims the benefit of and priority to U.S. Provisional Application Ser. No. 63/235,042, entitled "Linkage of Msg3 Repetition Request and Msg4 PUCCH Repetition" and filed on Aug. 19, 2021, which is expressly incorporated by reference herein in its entirety.

TECHNICAL FIELD

The present disclosure relates generally to communication systems, and more particularly, to a configuration to link a message 4 (Msg4) physical uplink control channel (PUCCH) coverage enhancement and a message 3 (Msg3) repetition request.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus transmits a physical random access channel (PRACH) to initiate a random access channel (RACH) procedure. The PRACH including a request for a first coverage enhancement associated with the RACH procedure. The request includes information related to at least a second coverage enhancement associated with an acknowledgement associated with the RACH procedure. The apparatus receives a random access response associated with the RACH procedure.

In an aspect of the disclosure, a method, a computer-readable medium, and an apparatus are provided. The apparatus may be a device at a base station. The device may be a processor and/or a modem at a base station or the base station itself. The apparatus receives, from a user equipment (UE), a physical random access channel (PRACH) to initiate a random access channel (RACH) procedure. The PRACH including a request for a first coverage enhancement associated with the RACH procedure. The request includes information related to at least a second coverage enhancement associated with an acknowledgement associated with the RACH procedure. The apparatus transmits, to the UE, a random access response associated with the RACH procedure.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
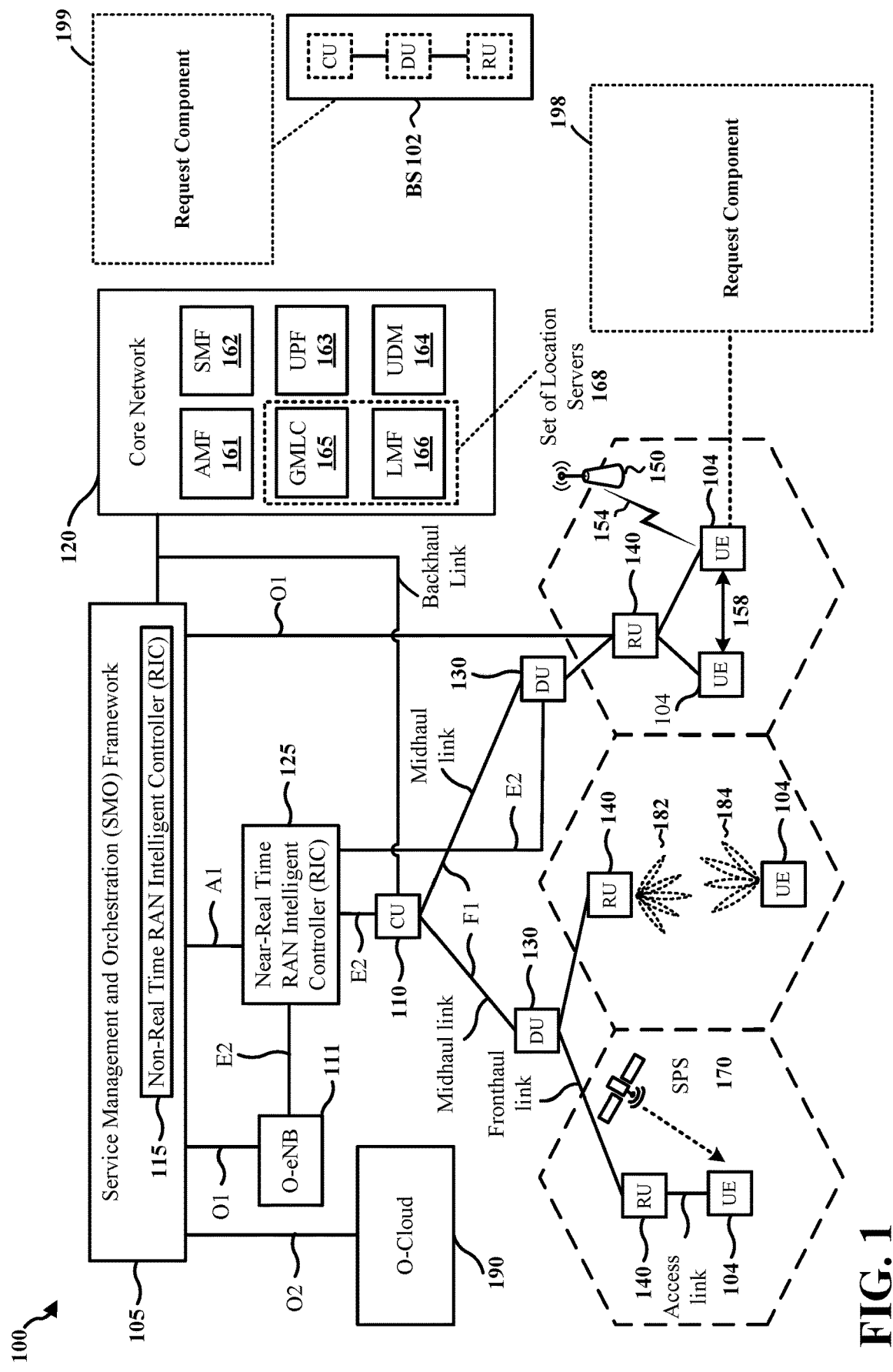
FIG. 1 is a diagram illustrating an example of a wireless communications system and an access network.

In wireless communications, Msg3 repetition and also dynamic indication of PUCCH repetition for unicast PUCCH may be configured for coverage enhancements. For Msg3 repetition, the UE may submit a request for Msg3 repetition via PRACH. Msg4 PUCCH coverage enhancement may be useful for some UEs which may have a weak uplink channel. To avoid excessive usage of uplink control resources, the base station may be configured to differentiate UEs that may request the coverage enhancement. The request for Msg4 PUCCH repetition may occur via Msg3, but this may add extra overhead to Msg3 or its transmission.

Aspects presented herein provide a configuration for indicating or requesting a Msg4 PUCCH coverage enhancement while minimizing signaling overhead. For example, a UE may be configured to link a Msg4 PUCCH coverage enhancement and a Msg3 repetition request.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHz), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to request Msg3 repetition request via PRACH where the request includes information related to a Msg4 PUCCH coverage enhancement. For example, the UE 104 may comprise a request component 198 configured to request Msg3 repetition request via PRACH where the request includes information related to a Msg4 PUCCH coverage enhancement. The UE 104 may transmit a PRACH to initiate a RACH procedure. The PRACH including a request for a first coverage enhancement associated with the RACH procedure. The request includes information related to at least a second coverage enhancement associated with an acknowledgement associated with the RACH procedure. The UE 104 may receive a random access response associated with the RACH procedure.

Referring again to FIG. 1, in certain aspects, the base station 102 may be configured to provide a Msg4 PUCCH coverage enhancement in response to a Msg3 repetition request. For example, the base station 102 may comprise a request component 199 configured to provide a Msg4 PUCCH coverage enhancement in response to a Msg3 repetition request. The base station 102 may receive, from a UE, a PRACH to initiate a RACH procedure. The PRACH including a request for a first coverage enhancement associated with the RACH procedure. The request includes information related to at least a second coverage enhancement associated with an acknowledgement associated with the RACH procedure. The base station 102 may transmit, to the UE, a random access response associated with the RACH procedure.

Although the following description may be focused on 5G NR, the concepts described herein may be applicable to other similar areas, such as LTE, LTE-A, CDMA, GSM, and other wireless technologies.

Figure 2:
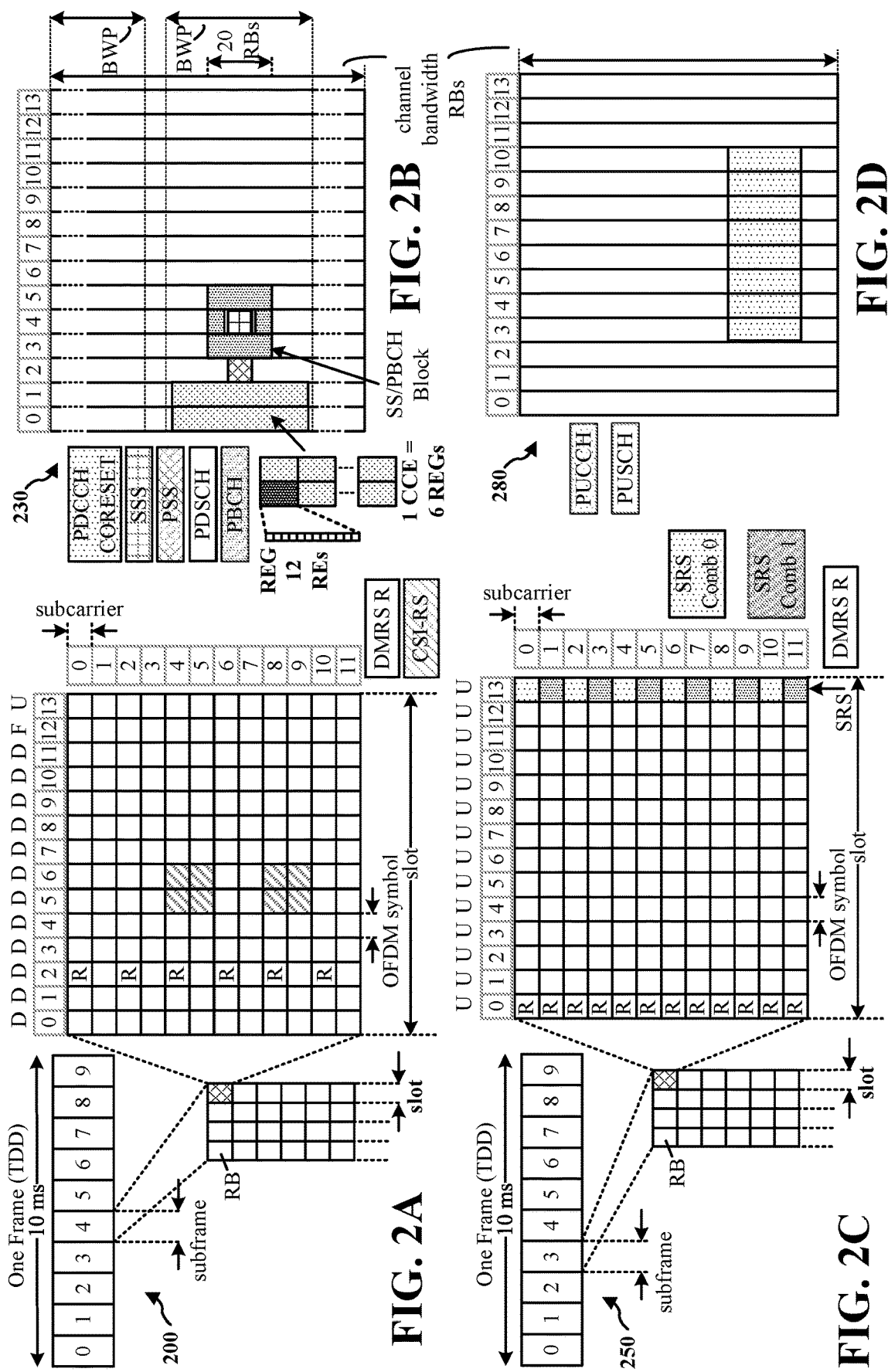
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
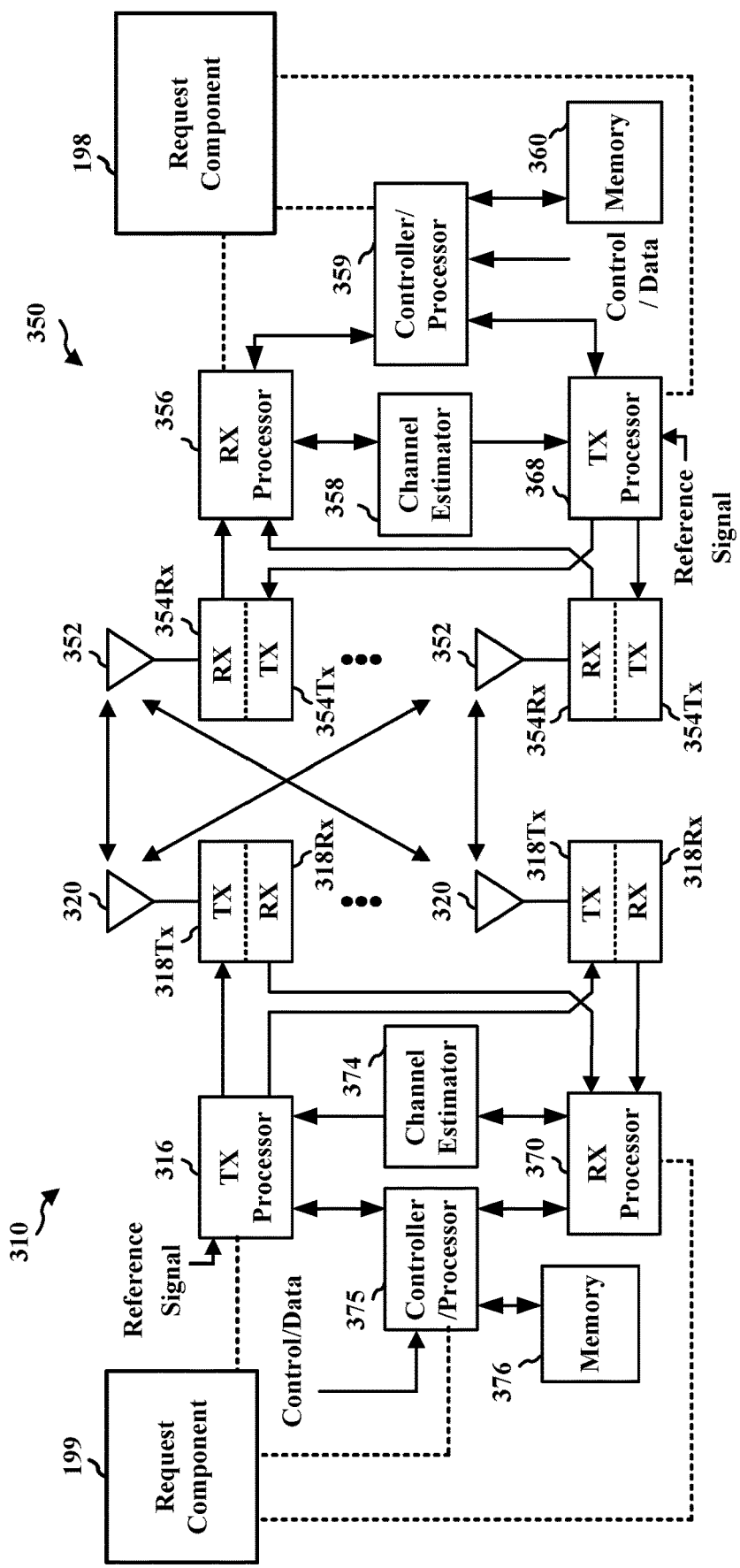
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the request component 198 of FIG. 1.

At least one of the TX processor 316, the RX processor 370, and the controller/processor 375 may be configured to perform aspects in connection with the request component 199 of FIG. 1.

Figure 4:
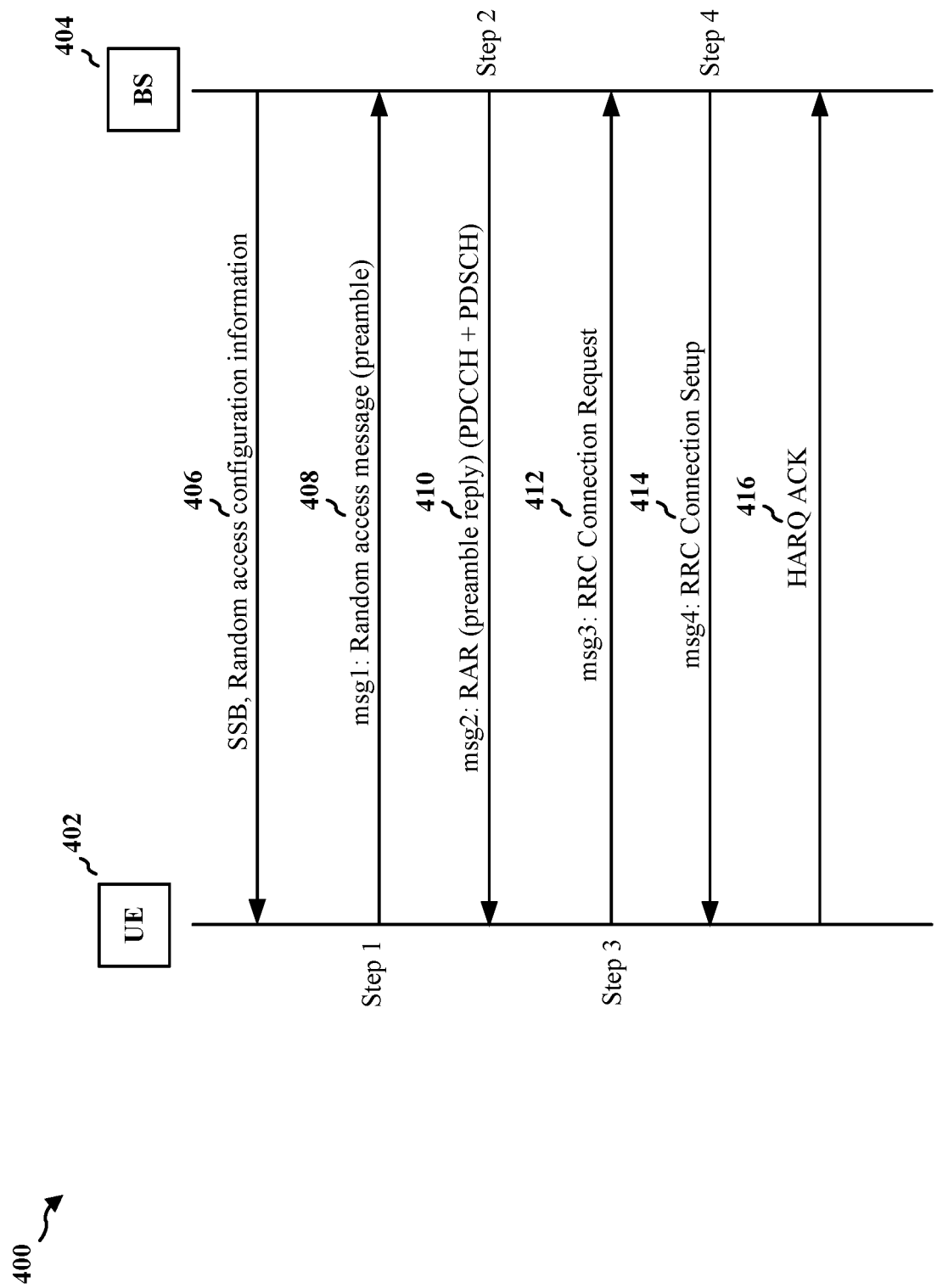
FIG. 4 is a diagram illustrating an example of a four-step random access procedure.

FIG. 4 is a diagram illustrating an example 400 of a four-step random access procedure, in accordance with the present disclosure. As shown in FIG. 4, a base station 404 and a UE 402 may communicate with one another to perform the four-step random access procedure.

At 406, the base station 404 may transmit one or more synchronization signal blocks (SSBs) and random access configuration information. The UE 402 may receive the one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving a random access response (RAR).

At 408, the UE 402 may transmit a RAM, which may include a preamble (sometimes referred to as a random access preamble, a physical RACH (PRACH) preamble, or a RAM preamble). The message that includes the preamble may be referred to as a message 1, msg1, MSG1, a first message, or an initial message in a four-step random access procedure. The random access message may include a random access preamble identifier.

At 410, the base station 404 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 402 in Msg1). Additionally, or alternatively, the RAR may indicate a resource allocation to be used by the UE 402 to transmit message 3 (Msg3).

In some aspects, as part of the second step of the four-step random access procedure, the base station 404 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the four-step random access procedure, the base station 404 may transmit the PDSCH communication for the RAR, as scheduled by the PDCCH communication. The RAR may be included in a medium access control (MAC) protocol data unit (PDU) of the PDSCH communication.

At 412, the UE 402 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

At 414, the base station 404 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information.

At 416, if the UE 402 successfully receives the RRC connection setup message, the UE 402 may transmit a hybrid automatic repeat request (HARQ) acknowledgment (ACK) via a physical uplink control channel (PUCCH) communication.

In wireless communications, Msg3 repetition and also dynamic indication of PUCCH repetition for unicast PUCCH may be configured for coverage enhancements. For Msg3 repetition, the UE may submit a request for Msg3 repetition via PRACH. Msg4 PUCCH coverage enhancement may be useful for some UEs which may have a weak uplink channel. To avoid excessive usage of uplink control resources, the base station may be configured to differentiate UEs that may request the coverage enhancement. The request for Msg4 PUCCH repetition may occur via Msg3, but this may add extra overhead to Msg3 or its transmission.

Aspects presented herein provide a configuration for indicating or requesting a Msg4 PUCCH coverage enhancement while minimizing signaling overhead. For example, a UE may be configured to link a Msg4 PUCCH coverage enhancement and a Msg3 repetition request.

In some aspects, a request of Msg3 repetition request via PRACH may indicate a potential request for Msg4 PUCCH coverage enhancement and/or a capability indication for Msg4 PUCCH coverage enhancement. The Msg4 PUCCH coverage enhancement may be performed by PUCCH repetition. In some aspects, the Msg4 PUCCH coverage enhancement may be done by a change of format. For example, a long PUCCH (e.g., format 1) may be used instead of a short PUCCH (e.g., format 0). In some aspects, the Msg4 PUCCH coverage enhancement may be granted or scheduled by Msg4, Msg4 PDCCH, message 2 (Msg2), and/or DCI that schedules Msg3 retransmission. Indication of whether the Msg3 repetition request is linked to the Msg4 PUCCH coverage enhancement may be indicated in system information (e.g., SIB1). In some aspects, a preconfigured coverage enhancement for Msg4 PUCCH may be applied based on the request from the UE without any additional scheduling confirmation. The coverage enhancement for Msg4 PUCCH may be preconfigured in system information (e.g., SIB1).

In some aspects, the request of Msg3 repetition request via PRACH may be considered as an implicit request for Msg4 PUCCH repetition, conditioned on Msg3 repetition being scheduled by the base station. The interpretation may differ based on whether Msg3 repetition is scheduled for initial Msg3 or Msg3 repetition. In some aspects, the request of Msg3 repetition request via PRACH may be considered as an implicit request for Msg4 PUCCH repetition, based on the PUCCH format. For example, the request for the PUCCH coverage enhancement may be valid for short PUCCH. In some aspects, the request of Msg3 repetition request via PRACH may be differentiated to Msg3 repetition only and Msg3 and PUCCH repetition request. Differentiation may be done by different RACH occasions or via different RACH resources. Differentiation may be done via PRACH repetition, PRACH repetition may indicate Msg3 and PUCCH repetition request. Different criteria (e.g., different thresholds on SS-RSRP) may be used for the two cases of Msg3 repetition only and Msg3 and PUCCH repetition request. Indication of Msg3 repetition only request or Msg3 and PUCCH repetition request by the UE may depend on the UE capability. For example, UEs may be capable only Msg3 repetition, while other UEs may be capable of both Msg3 repetition and Msg4 PUCCH repetition. In such instances, the same SS-RSRP threshold may be used as the criteria for triggering both.

Figure 5:
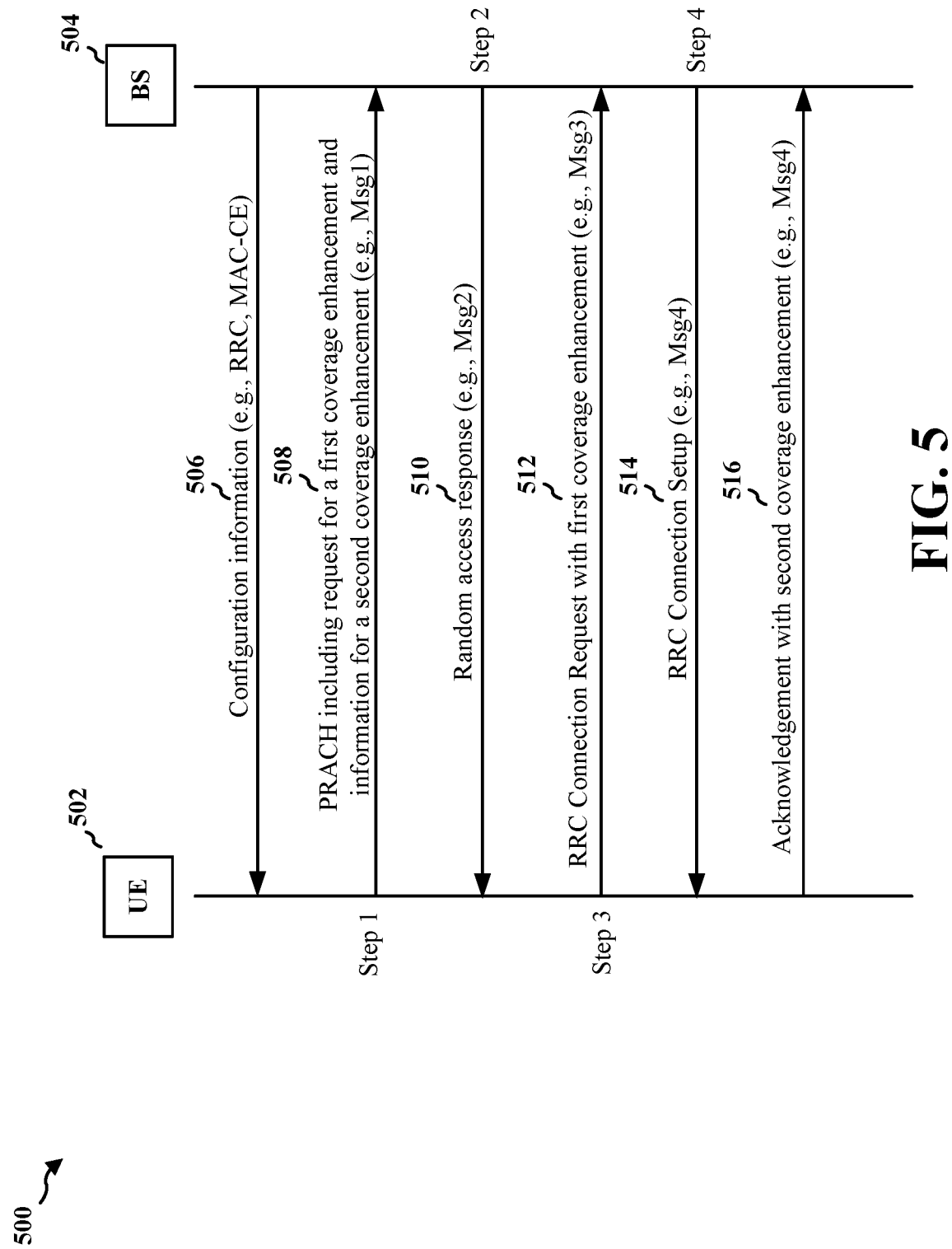
FIG. 5 is a diagram illustrating an example associated with random access channel coverage enhancement.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102. Further, a UE 502 may correspond to at least UE 104. In another example, in the context of FIG. 3, the base station 504 may correspond to base station 310 and the UE 502 may correspond to UE 350.

At 506, the base station 504 may transmit configuration information to the UE 502. The UE 502 may receive the configuration information from the base station 504. The UE 502 may receive the configuration information via RRC signaling or MAC-CE. The configuration information may configure the UE to request one or more coverage enhancements via PRACH of a RACH procedure. For example, the UE may transmit a PRACH to initiate a RACH procedure, where the PRACH may include a request for a first coverage enhancement associated with the RACH procedure. The request may further include information related to at least a second coverage enhancement associated with an acknowledgement associated with the RACH procedure.

At 508, the UE 502 may transmit the PRACH to initiate the RACH procedure to the base station 504. The base station 504 may receive the PRACH from the UE 502. The PRACH may include a request for the first coverage enhancement and information related to the second coverage enhancement. In some aspects, the first coverage enhancement may correspond to a repetition request for an RRC connection request message (e.g., Msg3). In some aspects, the second coverage enhancement may correspond to a repetition request for an RRC connection setup message (e.g., Msg4). In some aspects, the information related to the at least the second coverage enhancement may comprise a request for the second coverage enhancement or a capability indication related to the second coverage enhancement. In some aspects, the second coverage enhancement comprises repetition of a PUCCH associated with the acknowledgement. In some aspects, the second coverage enhancement may comprise a change of format of a PUCCH associated with the acknowledgement. In some aspects, the second coverage enhancement may be scheduled based on at least one of a PDCCH or a DCI that configures the first coverage enhancement. In some aspects, an interconnection between the first and second coverage enhancements may be included in a system information block. In some aspects, the request for the first coverage enhancement may further include a request for the second coverage enhancement if the first coverage enhancement is scheduled by a base station. In some aspects, the request for the first coverage enhancement may comprise a repetition request for an RRC connection request message (e.g., Msg3) or the repetition request for the RRC connection request message (e.g., Msg4) and a repetition of a PUCCH request.

At 510, the base station 504 may transmit a random access response (e.g., Msg2) to the UE 502. The random access response may be associated with the RACH procedure. The UE 502 may receive the random access response (e.g., Msg2) associated with the RACH procedure from the base station 504. The base station may transmit the random access response in response to the PRACH from the UE.

At 512, the UE 502 may transmit an RRC connection request message (e.g., Msg3). The RRC connection request message may be transmitted with the first coverage enhancement. The RRC connection request message may be transmitted with the first coverage enhancement to the base station 504. The base station 504 may receive the RRC connection request message from the UE 502 transmitted using the first coverage enhancement. The UE 502 may transmit the RRC connection request message with the first coverage enhancement in response to the random access response from the base station.

At 514, the base station 504 may transmit an RRC connection setup message. The base station may transmit the RRC connection setup message to the UE 502. The UE 502 may receive the RRC connection setup message from the base station 504. The base station may transmit the RRC connection setup message in response to the RRC connection request message from the UE.

At 516, the UE 502 may transmit an acknowledgement. The UE may transmit the acknowledgement using the second coverage enhancement. The UE may transmit the acknowledgement using the second coverage enhancement to the base station 504. The base station 504 may receive the acknowledgement from the UE 502 transmitted using the second coverage enhancement. The UE may transmit the acknowledgement in response to the RRC connection setup message from the base station.

Figure 6:
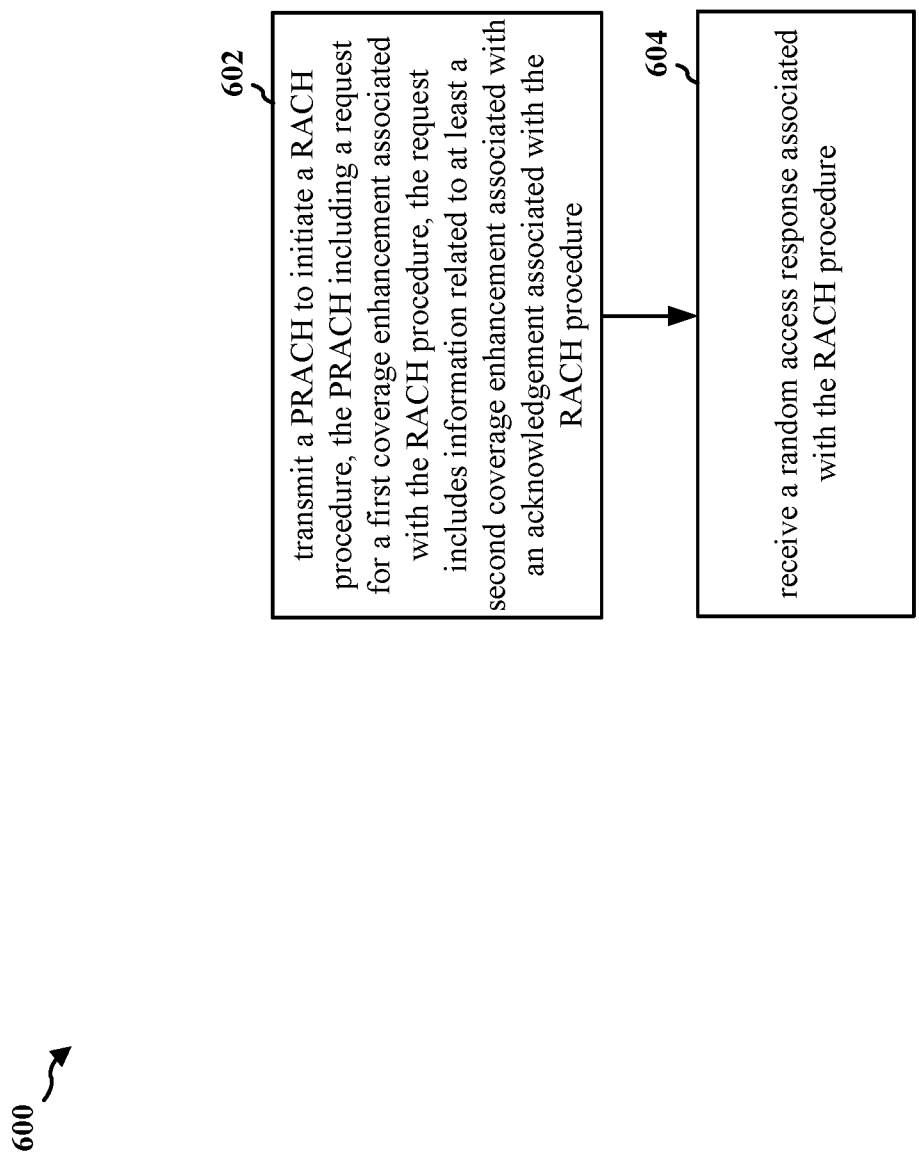
FIG. 6 is a flowchart of a method of wireless communication.

FIG. 6 is a flowchart 600 of a method of wireless communication. The method may be performed by a UE (e.g., the UE 104; the apparatus 804). One or more of the illustrated operations may be omitted, transposed, or contemporaneous. The method may allow a UE to request Msg3 repetition request via PRACH where the request includes information related to a Msg4 PUCCH coverage enhancement.

At 602, the UE may transmit a PRACH to initiate a RACH procedure, the PRACH including a request for a first coverage enhancement associated with the RACH procedure. For example, 602 may be performed by request component 198 of apparatus 804. The request may include information related to at least a second coverage enhancement associated with an acknowledgement associated with the RACH procedure. In some aspects, the first coverage enhancement may correspond to a repetition request for an RRC connection request message (e.g., Msg3). The second coverage enhancement may correspond to a repetition request for an RRC connection setup message (e.g., Msg4). In some aspects, the information related to the at least the second coverage enhancement may comprise a request for the second coverage enhancement or a capability indication related to the second coverage enhancement. In some aspects, the second coverage enhancement comprises repetition of a PUCCH associated with the acknowledgement. In some aspects, the second coverage enhancement may comprise a change of format of a PUCCH associated with the acknowledgement. In some aspects, the second coverage enhancement may be scheduled based on at least one of a PDCCH or a DCI that configures the first coverage enhancement. In some aspects, an interconnection between the first and second coverage enhancements may be included in a system information block. In some aspects, the request for the first coverage enhancement may further include a request for the second coverage enhancement if the first coverage enhancement is scheduled by a base station. In some aspects, the request for the first coverage enhancement may comprise a repetition request for a RRC connection request message (e.g., Msg3) or the repetition request for the RRC connection request message (e.g., Msg4) and a repetition of a PUCCH request.

At 604, the UE may receive a random access response associated with the RACH procedure. For example, 604 may be performed by request component 198 of apparatus 804. The UE may receive the random access response associated with the RACH procedure from the base station.

Figure 7:
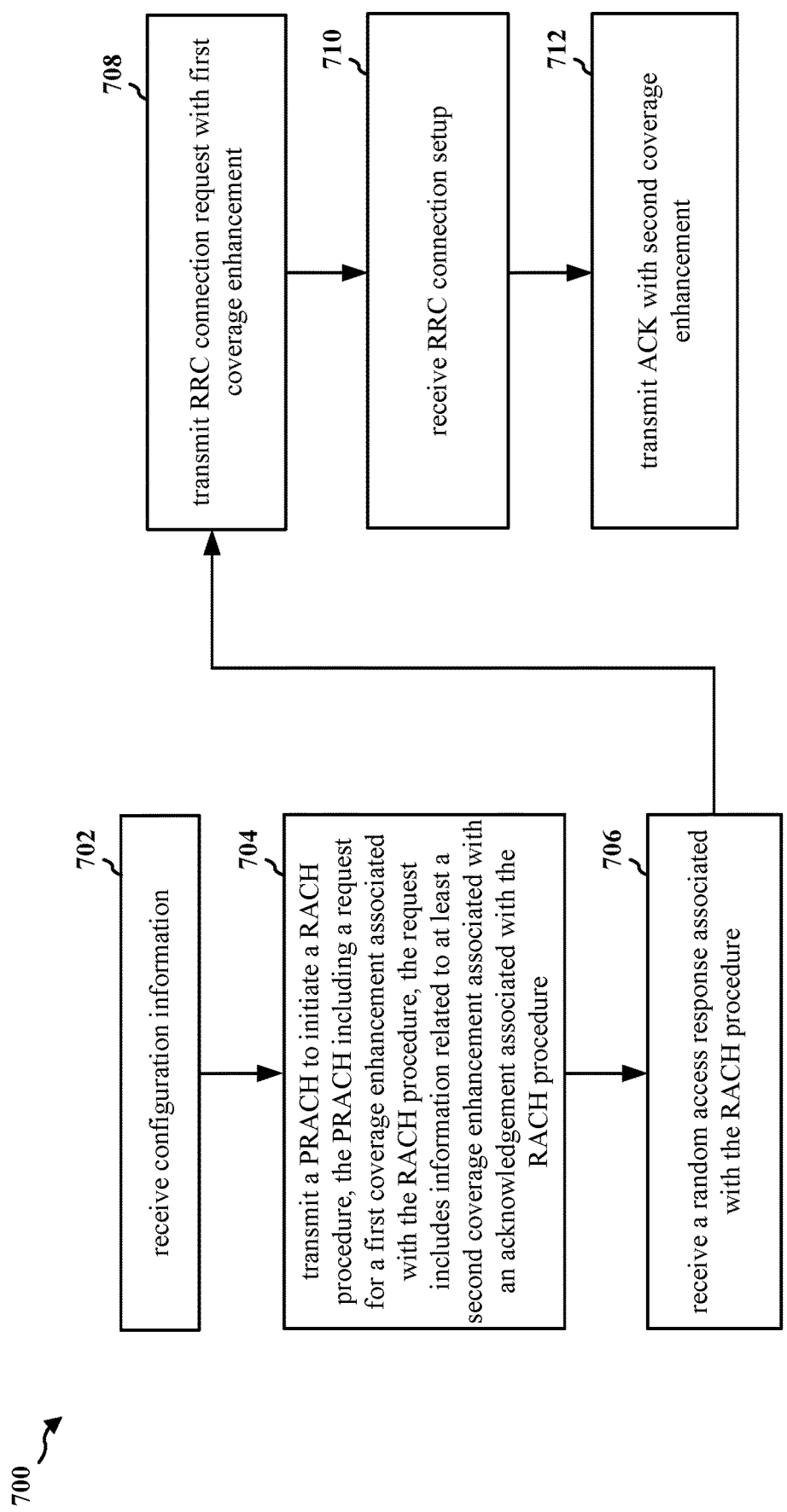
FIG. 7 is a flowchart of a method of wireless communication.

FIG. 7 is a flowchart 700 of a method of wireless communication. The method may be performed by a UE (e.g., the UE 104; the apparatus 804). One or more of the illustrated operations may be omitted, transposed, or contemporaneous. The method may allow a UE to request Msg3 repetition request via PRACH where the request includes information related to a Msg4 PUCCH coverage enhancement.

At 702, the UE may receive configuration information from the base station. For example, 702 may be performed by request component 198 of apparatus 804. The UE may receive the configuration information via RRC signaling or MAC-CE. The configuration information may configure the UE to request one or more coverage enhancements via PRACH of a RACH procedure. For example, the UE may transmit a PRACH to initiate a RACH procedure, where the PRACH may include a request for a first coverage enhancement associated with the RACH procedure. The request may further include information related to at least a second coverage enhancement associated with an acknowledgement associated with the RACH procedure.

At 704, the UE may transmit a PRACH to initiate a RACH procedure, the PRACH including a request for a first coverage enhancement associated with the RACH procedure. For example, 704 may be performed by request component 198 of apparatus 804. The request may include information related to at least a second coverage enhancement associated with an acknowledgement associated with the RACH procedure. In some aspects, the first coverage enhancement may correspond to a repetition request for an RRC connection request message (e.g., Msg3). The second coverage enhancement may correspond to a repetition request for an RRC connection setup message (e.g., Msg4). In some aspects, the information related to the at least the second coverage enhancement may comprise a request for the second coverage enhancement or a capability indication related to the second coverage enhancement. In some aspects, the second coverage enhancement comprises repetition of a PUCCH associated with the acknowledgement. In some aspects, the second coverage enhancement may comprise a change of format of a PUCCH associated with the acknowledgement. In some aspects, the second coverage enhancement may be scheduled based on at least one of a PDCCH or a DCI that configures the first coverage enhancement. In some aspects, an interconnection between the first and second coverage enhancements may be included in a system information block. In some aspects, the request for the first coverage enhancement may further include a request for the second coverage enhancement if the first coverage enhancement is scheduled by a base station. In some aspects, the request for the first coverage enhancement may comprise a repetition request for a RRC connection request message (e.g., Msg3) or the repetition request for the RRC connection request message (e.g., Msg4) and a repetition of a PUCCH request.

At 706, the UE may receive a random access response associated with the RACH procedure. For example, 706 may be performed by request component 198 of apparatus 804. The UE may receive the random access response associated with the RACH procedure from the base station.

At 708, the UE may transmit an RRC connection request message (e.g., Msg3). For example, 708 may be performed by request component 198 of apparatus 804. The RRC connection request message may be transmitted with the first coverage enhancement. The RRC connection request message may be transmitted with the first coverage enhancement to the base station. The UE may transmit the RRC connection request message with the first coverage enhancement in response to the random access response from the base station.

At 710, the UE may receive an RRC connection setup message. For example, 710 may be performed by request component 198 of apparatus 804. The UE may receive the RRC connection setup message from the base station. The base station may transmit the RRC connection setup message in response to the RRC connection request message from the UE.

At 712, the UE may transmit an acknowledgement. For example, 712 may be performed by request component 198 of apparatus 804. The UE may transmit the acknowledgement using the second coverage enhancement. The UE may transmit the acknowledgement using the second coverage enhancement to the base station. The UE may transmit the acknowledgement in response to the RRC connection setup message from the base station.

Figure 8:
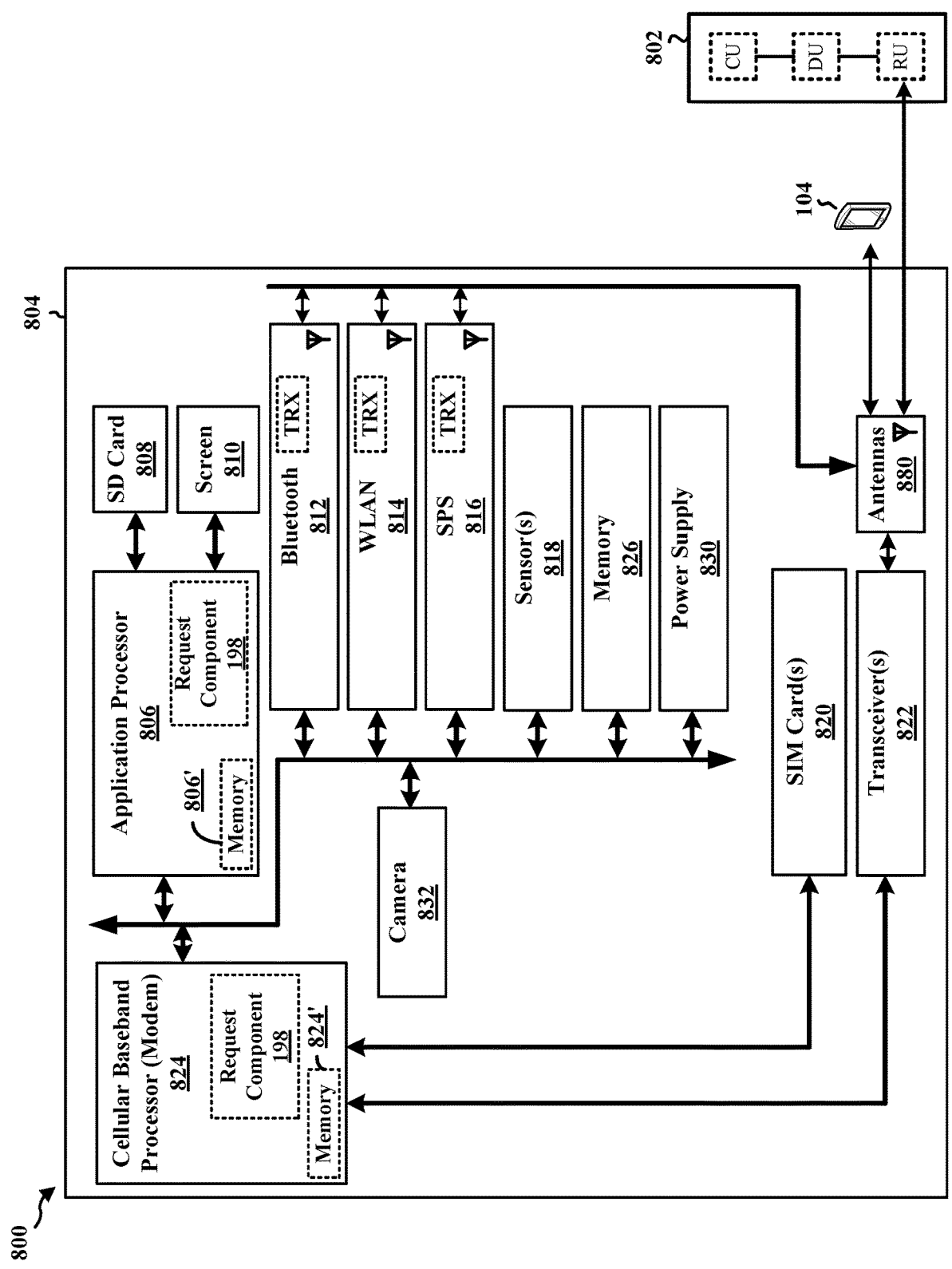
FIG. 8 is a diagram illustrating an example of a hardware implementation for an example apparatus and/or network entity.

FIG. 8 is a diagram 800 illustrating an example of a hardware implementation for an apparatus 804. The apparatus 804 may be a UE, a component of a UE, or may implement UE functionality. In some aspects, the apparatus 804 may include a cellular baseband processor 824 (also referred to as a modem) coupled to one or more transceivers 822 (e.g., cellular RF transceiver). The cellular baseband processor 824 may include on-chip memory 824'. In some aspects, the apparatus 804 may further include one or more subscriber identity modules (SIM) cards 820 and an application processor 806 coupled to a secure digital (SD) card 808 and a screen 810. The application processor 806 may include on-chip memory 806'. In some aspects, the apparatus 804 may further include a Bluetooth module 812, a WLAN module 814, an SPS module 816 (e.g., GNSS module), one or more sensor modules 818 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 826, a power supply 830, and/or a camera 832. The Bluetooth module 812, the WLAN module 814, and the SPS module 816 may include an on-chip transceiver (TRX) (or in some cases, just a receiver (RX)). The Bluetooth module 812, the WLAN module 814, and the SPS module 816 may include their own dedicated antennas and/or utilize the antennas 880 for communication. The cellular baseband processor 824 communicates through the transceiver(s) 822 via one or more antennas 880 with the UE 104 and/or with an RU associated with a network entity 802. The cellular baseband processor 824 and the application processor 806 may each include a computer-readable medium/memory 824', 806', respectively. The additional memory modules 826 may also be considered a computer-readable medium/memory. Each computer-readable medium/memory 824', 806', 826 may be non-transitory. The cellular baseband processor 824 and the application processor 806 are each responsible for general processing, including the execution of software stored on the computer-readable medium/memory. The software, when executed by the cellular baseband processor 824/application processor 806, causes the cellular baseband processor 824/application processor 806 to perform the various functions described supra. The computer-readable medium/memory may also be used for storing data that is manipulated by the cellular baseband processor 824/application processor 806 when executing software. The cellular baseband processor 824/application processor 806 may be a component of the UE 350 and may include the memory 360 and/or at least one of the TX processor 368, the RX processor 356, and the controller/processor 359. In one configuration, the apparatus 804 may be a processor chip (modem and/or application) and include just the cellular baseband processor 824 and/or the application processor 806, and in another configuration, the apparatus 804 may be the entire UE (e.g., see 350 of FIG. 3) and include the additional modules of the apparatus 804.

As discussed supra, the component 198 is configured to transmit a PRACH to initiate a RACH procedure, the PRACH including a request for a first coverage enhancement associated with the RACH procedure, wherein the request includes information related to at least a second coverage enhancement associated with an acknowledgement associated with the RACH procedure; and receive a random access response associated with the RACH procedure. The component 198 may be within the cellular baseband processor 824, the application processor 806, or both the cellular baseband processor 824 and the application processor 806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 804 may include a variety of components configured for various functions. In one configuration, the apparatus 804, and in particular the cellular baseband processor 824 and/or the application processor 806, includes means for transmitting a PRACH to initiate a RACH procedure. The PRACH including a request for a first coverage enhancement associated with the RACH procedure. The request includes information related to at least a second coverage enhancement associated with an acknowledgement associated with the RACH procedure. The apparatus includes means for receive a random access response associated with the RACH procedure. The means may be the component 198 of the apparatus 804 configured to perform the functions recited by the means. As described supra, the apparatus 804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 9:
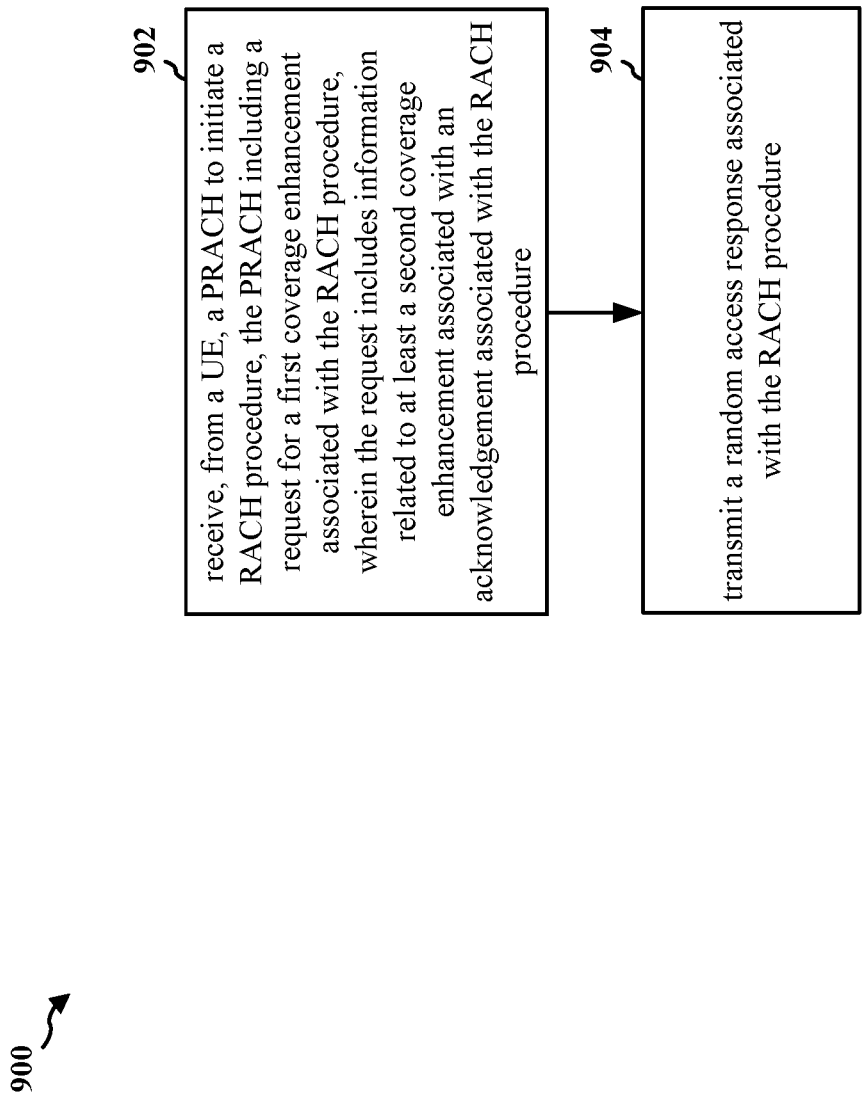
FIG. 9 is a flowchart of a method of wireless communication.

FIG. 9 is a flowchart 900 of a method of wireless communication. The method may be performed by a base station (e.g., the base station 102; the network entity 802. One or more of the illustrated operations may be omitted, transposed, or contemporaneous. The method may allow a base station to configure a UE to request Msg3 repetition request via PRACH where the request includes information related to a Msg4 PUCCH coverage enhancement.

At 902, the base station may receive a PRACH to initiate a RACH procedure, the PRACH including a request for a first coverage enhancement associated with the RACH procedure. For example, 902 may be performed by request component 199 of network entity 802. The base station may receive the PRACH to initiate the RACH procedure from a UE. The request may include information related to at least a second coverage enhancement associated with an acknowledgement associated with the RACH procedure. In some aspects, the first coverage enhancement may correspond to a repetition request for a RRC connection request message (e.g., Msg3). The second coverage enhancement may correspond to a repetition request for an RRC connection setup message (e.g., Msg4). In some aspects, the information related to the at least the second coverage enhancement may comprise a request for the second coverage enhancement or a capability indication related to the second coverage enhancement. In some aspects, the second coverage enhancement may comprise repetition of a PUCCH associated with the acknowledgement. In some aspects, the second coverage enhancement comprises a change of format of a PUCCH associated with the acknowledgement. In some aspects, the second coverage enhancement may be scheduled based on at least one of a PDCCH or a DCI that configures the first coverage enhancement. In some aspects, an interconnection between the first and second coverage enhancements may be included in a system information block. In some aspects, the request for the first coverage enhancement may further include a request for the second coverage enhancement if the first coverage enhancement is scheduled by the base station. In some aspects, the request for the first coverage enhancement comprises a repetition request for a RRC connection request message (e.g., Msg3) or the repetition request for the RRC connection request message (e.g., Msg4) and a repetition of a PUCCH request.

At 904, the base station may transmit a random access response associated with the RACH procedure. For example, 904 may be performed by request component 199 of network entity 802. The base station may transmit the random access response associated with the RACH procedure to the UE.

Figure 10:
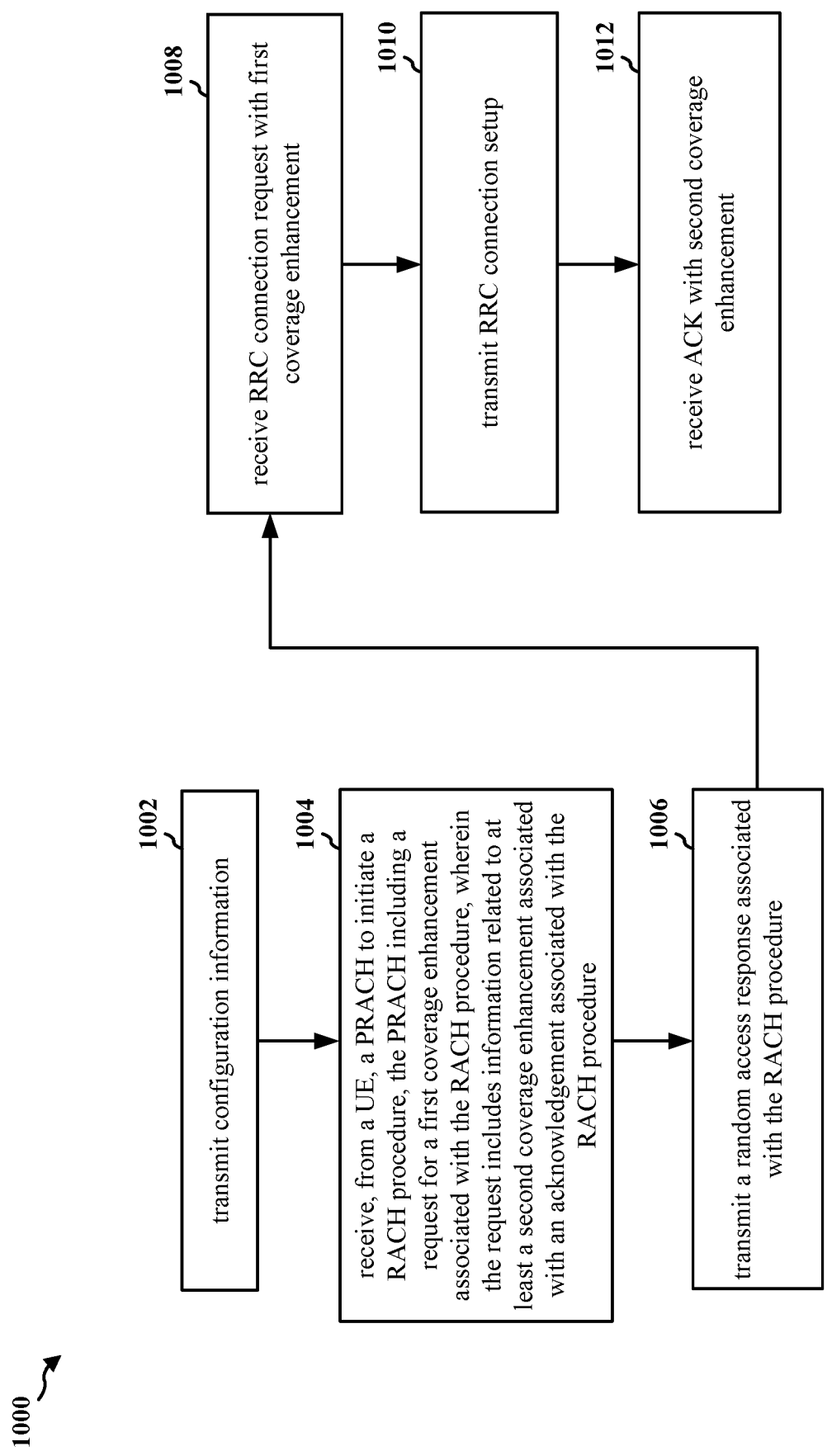
FIG. 10 is a flowchart of a method of wireless communication.

FIG. 10 is a flowchart 1000 of a method of wireless communication. The method may be performed by a base station (e.g., the base station 102; the network entity 802. One or more of the illustrated operations may be omitted, transposed, or contemporaneous. The method may allow a base station to configure a UE to request Msg3 repetition request via PRACH where the request includes information related to a Msg4 PUCCH coverage enhancement.

At 1002, the base station may transmit configuration information to the UE. For example, 1002 may be performed by request component 199 of network entity 802. The base station may transmit the configuration information via RRC signaling or MAC-CE. The configuration information may configure the UE to request one or more coverage enhancements via PRACH of a RACH procedure. For example, the UE may be configured to transmit a PRACH to initiate a RACH procedure, where the PRACH may include a request for a first coverage enhancement associated with the RACH procedure. The request may further include information related to at least a second coverage enhancement associated with an acknowledgement associated with the RACH procedure.

At 1004, the base station may receive a PRACH to initiate a RACH procedure, the PRACH including a request for a first coverage enhancement associated with the RACH procedure. For example, 1004 may be performed by request component 199 of network entity 802. The base station may receive the PRACH to initiate the RACH procedure from a UE. The request may include information related to at least a second coverage enhancement associated with an acknowledgement associated with the RACH procedure. In some aspects, the first coverage enhancement may correspond to a repetition request for a RRC connection request message (e.g., Msg3). The second coverage enhancement may correspond to a repetition request for an RRC connection setup message (e.g., Msg4). In some aspects, the information related to the at least the second coverage enhancement may comprise a request for the second coverage enhancement or a capability indication related to the second coverage enhancement. In some aspects, the second coverage enhancement may comprise repetition of a PUCCH associated with the acknowledgement. In some aspects, the second coverage enhancement comprises a change of format of a PUCCH associated with the acknowledgement. In some aspects, the second coverage enhancement may be scheduled based on at least one of a PDCCH or a DCI that configures the first coverage enhancement. In some aspects, an interconnection between the first and second coverage enhancements may be included in a system information block. In some aspects, the request for the first coverage enhancement may further include a request for the second coverage enhancement if the first coverage enhancement is scheduled by the base station. In some aspects, the request for the first coverage enhancement comprises a repetition request for a RRC connection request message (e.g., Msg3) or the repetition request for the RRC connection request message (e.g., Msg4) and a repetition of a PUCCH request.

At 1006, the base station may transmit a random access response (e.g., Msg2). For example, 1006 may be performed by request component 199 of network entity 802. The base station may transmit the random access response to the UE. The random access response may be associated with the RACH procedure. The base station may transmit the random access response in response to the PRACH from the UE.

At 1008, the base station may receive an RRC connection request message (e.g., Msg3). For example, 1008 may be performed by request component 199 of network entity 802. The RRC connection request message may be transmitted by the UE with the first coverage enhancement. The base station may receive the RRC connection request message from the UE transmitted using the first coverage enhancement. The base station may receive the RRC connection request message with the first coverage enhancement in response to the random access response transmitted to the UE.

At 1010, the base station may transmit an RRC connection setup message. For example, 1010 may be performed by the request component 199 of the network entity 802. The base station may transmit the RRC connection setup message to the UE. The base station may transmit the RRC connection setup message in response to the RRC connection request message from the UE.

At 1012, the base station may receive an acknowledgement. For example, 1012 may be performed by request component 199 of network entity 802. The base station may receive the acknowledgement transmitted by the UE. The UE may transmit the acknowledgement using the second coverage enhancement to the base station. The base station may receive the acknowledgement from the UE transmitted using the second coverage enhancement. The base station may receive the acknowledgement from the UE in response to the RRC connection setup message transmitted to the UE.

Figure 11:
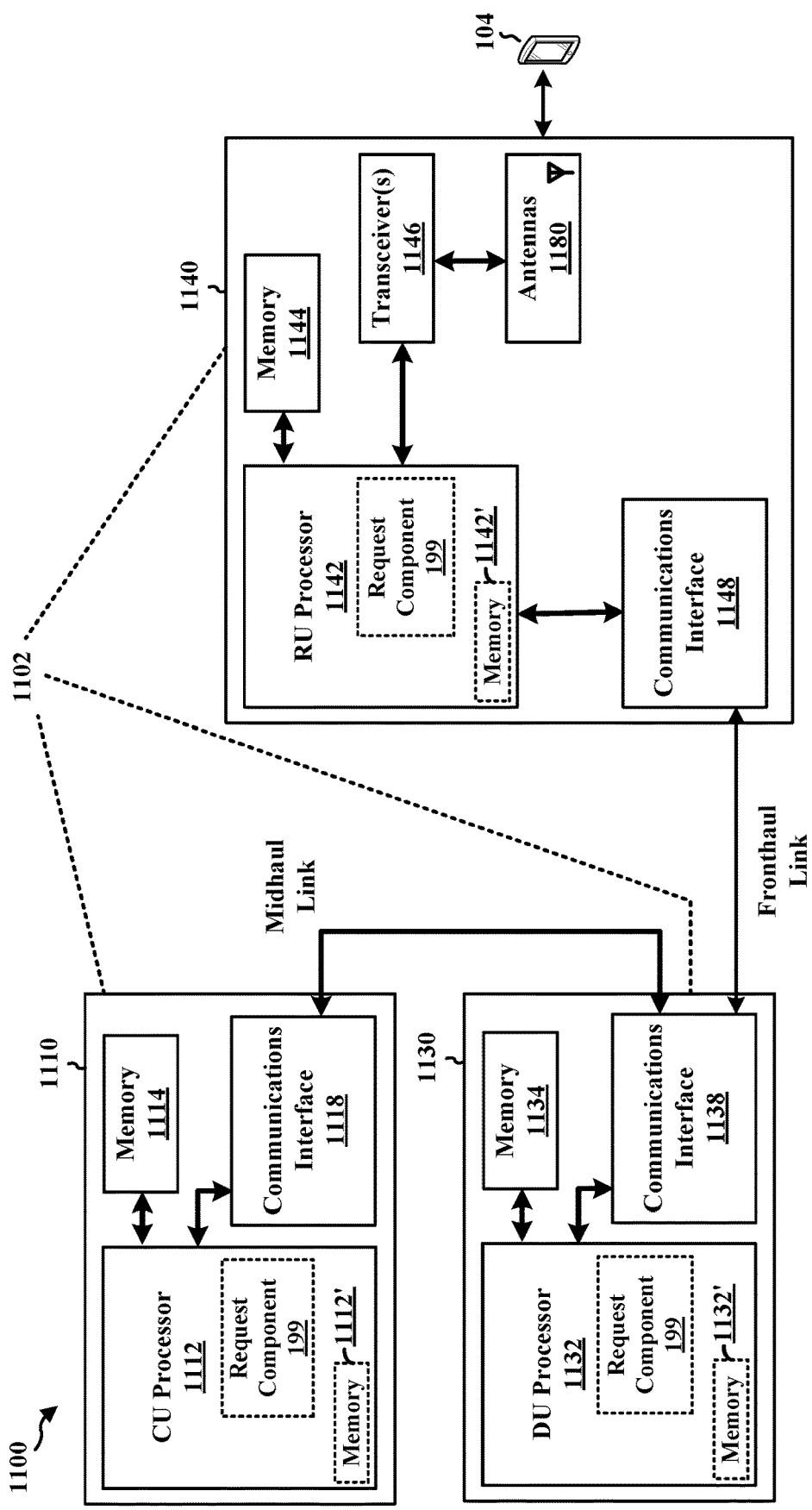
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to obtain a physical random access channel (PRACH) to initiate a random access channel (RACH) procedure, the PRACH including a request for a first coverage enhancement associated with the RACH procedure, wherein the request includes information related to at least a second coverage enhancement associated with an acknowledgement associated with the RACH procedure; and output a random access response associated with the RACH procedure. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for obtaining a PRACH to initiate a random access channel (RACH) procedure. The PRACH including a request for a first coverage enhancement associated with the RACH procedure. The request includes information related to at least a second coverage enhancement associated with an acknowledgement associated with the RACH procedure. The apparatus includes means for outputting a random access response associated with the RACH procedure. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method of wireless communication at a UE, comprising transmitting a PRACH to initiate a RACH procedure, the PRACH including a request for a first coverage enhancement associated with the RACH procedure, wherein the request includes information related to at least a second coverage enhancement associated with an acknowledgement associated with the RACH procedure; and receiving a random access response associated with the RACH procedure.

Aspect 2 is the method of aspect 1, further includes that the first coverage enhancement corresponds to a repetition request for an RRC connection request message, wherein the second coverage enhancement corresponds to a repetition request for an RRC connection setup message.

Aspect 3 is the method of any of aspects 1 and 2, further includes that the information related to the at least the second coverage enhancement comprises a request for the second coverage enhancement or a capability indication related to the second coverage enhancement.

Aspect 4 is the method of any of aspects 1-3, further includes that the second coverage enhancement comprises repetition of a PUCCH associated with the acknowledgement.

Aspect 5 is the method of any of aspects 1-4, further includes that the second coverage enhancement comprises a change of format of a PUCCH associated with the acknowledgement.

Aspect 6 is the method of any of aspects 1-5, further includes that the second coverage enhancement is scheduled based on at least one of a PDCCH or a DCI that configures the first coverage enhancement.

Aspect 7 is the method of any of aspects 1-6, further includes that an interconnection between the first coverage enhancement and the second coverage enhancement is included in a system information block.

Aspect 8 is the method of any of aspects 1-7, further includes that the request for the first coverage enhancement further includes a request for the second coverage enhancement if the first coverage enhancement is scheduled by a network node.

Aspect 9 is the method of any of aspects 1-8, further includes that the request for the first coverage enhancement comprises a repetition request for an RRC connection request message or the repetition request for the RRC connection request message and a repetition of a PUCCH request.

Aspect 10 is an apparatus for wireless communication at a UE including at least one processor coupled to a memory and at least one transceiver, the at least one processor configured to implement any of Aspects 1-9.

Aspect 11 is an apparatus for wireless communication at a UE including means for implementing any of Aspects 1-9.

Aspect 12 is a computer-readable medium storing computer executable code, where the code when executed by a processor causes the processor to implement any of Aspects 1-12.

Aspect 13 is a method of wireless communication at a network node, comprising obtaining a PRACH to initiate a RACH procedure, the PRACH including a request for a first coverage enhancement associated with the RACH procedure, wherein the request includes information related to at least a second coverage enhancement associated with an acknowledgement associated with the RACH procedure; and outputting a random access response associated with the RACH procedure.

Aspect 14 is the method of aspect 13, further includes that the first coverage enhancement corresponds to a repetition request for an RRC connection request message, wherein the second coverage enhancement corresponds to a repetition request for an RRC connection setup message.

Aspect 15 is the method of any of aspects 13 and 14, further includes that the information related to the at least the second coverage enhancement comprises a request for the second coverage enhancement or a capability indication related to the second coverage enhancement.

Aspect 16 is the method of any of aspects 13-15, further includes that the second coverage enhancement comprises repetition of a PUCCH associated with the acknowledgement.

Aspect 17 is the method of any of aspects 13-16, further includes that the second coverage enhancement comprises a change of format of a PUCCH associated with the acknowledgement.

Aspect 18 is the method of any of aspects 13-17, further includes that the second coverage enhancement is scheduled based on at least one of a PDCCH or a DCI that configures the first coverage enhancement.

Aspect 19 is the method of any of aspects 13-18, further includes that an interconnection between the first coverage enhancement and the second coverage enhancement is included in a system information block.

Aspect 20 is the method of any of aspects 13-19, further includes that the request for the first coverage enhancement further includes a request for the second coverage enhancement if the first coverage enhancement is scheduled by the network node.

Aspect 21 is the method of any of aspects 13-20, further includes that the request for the first coverage enhancement comprises a repetition request for an RRC connection request message or the repetition request for the RRC connection request message and a repetition of a PUCCH request.

Aspect 22 is an apparatus for wireless communication at a network node including at least one processor coupled to a memory and at least one transceiver, the at least one processor configured to implement any of Aspects 13-21.

Aspect 23 is an apparatus for wireless communication at a network node including means for implementing any of Aspects 13-21.

Aspect 24 is a computer-readable medium storing computer executable code, where the code when executed by a processor causes the processor to implement any of Aspects 13-21.

What is claimed is:

1. An apparatus for wireless communication at a user equipment (UE), comprising:
    memory; and
    at least one processor coupled to the memory and configured to:
        transmit a physical random access channel (PRACH) to initiate a random access channel (RACH) procedure, the PRACH including a request for a first coverage enhancement associated with the RACH procedure, wherein the request includes information related to a second coverage enhancement associated with an acknowledgement associated with the RACH procedure, wherein the information related to the second coverage enhancement corresponds to a request for the second coverage enhancement or a capability indication related to the second coverage enhancement, wherein the first coverage enhancement corresponds to a repetition request for a radio resource control (RRC) connection request message, wherein the second coverage enhancement corresponds to a repetition request for an RRC connection setup message; and
        receive a random access response associated with the RACH procedure.

2. The apparatus of claim 1, further comprising a transceiver coupled to the at least one processor.

3. The apparatus of claim 1, wherein the information related to the second coverage enhancement comprises the request for the second coverage enhancement or the capability indication related to the second coverage enhancement.

4. The apparatus of claim 1, wherein the second coverage enhancement comprises repetition of a physical uplink control channel (PUCCH) associated with the acknowledgement.

5. The apparatus of claim 1, wherein the second coverage enhancement comprises a change of format of a physical uplink control channel (PUCCH) associated with the acknowledgement.

6. The apparatus of claim 1, wherein to schedule the second coverage enhancement, the at least one processor is configured to schedule the second coverage enhancement based on at least one of a physical downlink control channel (PDCCH) or a downlink control information (DCI) that configures the first coverage enhancement.

7. The apparatus of claim 1, wherein the information related to the second coverage enhancement is included in a system information block.

8. The apparatus of claim 1, wherein the information related to the second coverage enhancement comprises the request for the second coverage enhancement or the capability indication related to the second coverage enhancement.

9. The apparatus of claim 1, wherein the request for the first coverage enhancement comprises the repetition request for the RRC connection request message or the repetition request for the RRC connection request message and a repetition of a physical uplink control channel (PUCCH) request.

10. A method of wireless communication at a user equipment (UE), comprising:
transmitting a physical random access channel (PRACH) to initiate a random access channel (RACH) procedure, the PRACH including a request for a first coverage enhancement associated with the RACH procedure, wherein the request includes information related to a second coverage enhancement associated with an acknowledgement associated with the RACH procedure, wherein the information related to the second coverage enhancement corresponds to a request for the second coverage enhancement or a capability indication related to the second coverage enhancement, wherein the first coverage enhancement corresponds to a repetition request for a radio resource control (RRC) connection request message, wherein the second coverage enhancement corresponds to a repetition request for an RRC connection setup message; and
receiving a random access response associated with the RACH procedure.

11. The method of claim 10, wherein the information related to the second coverage enhancement comprises the request for the second coverage enhancement or the capability indication related to the second coverage enhancement.

12. The method of claim 10, wherein the second coverage enhancement comprises repetition of a physical uplink control channel (PUCCH) associated with the acknowledgement.

13. The method of claim 10, wherein the second coverage enhancement comprises a change of format of a physical uplink control channel (PUCCH) associated with the acknowledgement.

14. The method of claim 10, wherein the second coverage enhancement is scheduled based on at least one of a physical downlink control channel (PDCCH) or a downlink control information (DCI) that configures the first coverage enhancement.

15. An apparatus for wireless communication at a network node, comprising:
memory; and
at least one processor coupled to the memory and configured to:
obtain a physical random access channel (PRACH) to initiate a random access channel (RACH) procedure, the PRACH including a request for a first coverage enhancement associated with the RACH procedure, wherein the request includes information related to a second coverage enhancement associated with an acknowledgement associated with the RACH procedure, wherein the information related to the second coverage enhancement corresponds to a request for the second coverage enhancement or a capability indication related to the second coverage enhancement, wherein the first coverage enhancement corresponds to a repetition request for a radio resource control (RRC) connection request message, wherein the second coverage enhancement corresponds to a repetition request for an RRC connection setup message; and
output a random access response associated with the RACH procedure.

16. The apparatus of claim 15, further comprising a transceiver coupled to the at least one processor.

17. The apparatus of claim 15, wherein the information related to the second coverage enhancement comprises the request for the second coverage enhancement or the capability indication related to the second coverage enhancement.

18. The apparatus of claim 15, wherein the second coverage enhancement comprises repetition of a physical uplink control channel (PUCCH) associated with the acknowledgement.

19. The apparatus of claim 15, wherein the second coverage enhancement comprises a change of format of a physical uplink control channel (PUCCH) associated with the acknowledgement.

20. The apparatus of claim 15, wherein to schedule the second coverage enhancement, the at least one processor is configured to schedule the second coverage enhancement based on at least one of a physical downlink control channel (PDCCH) or a downlink control information (DCI) that configures the first coverage enhancement.

21. The apparatus of claim 15, wherein the information related to the second coverage enhancement is included in a system information block.

22. The apparatus of claim 15, wherein the information related to the second coverage enhancement corresponds to a request for the second coverage enhancement if the first coverage enhancement is scheduled by the network node.

23. The apparatus of claim 15, wherein the request for the first coverage enhancement comprises the repetition request for the RRC connection request message or the repetition request for the RRC connection request message and a repetition of a physical uplink control channel (PUCCH) request.

24. A method of wireless communication at a network node, comprising:
obtaining a physical random access channel (PRACH) to initiate a random access channel (RACH) procedure, the PRACH including a request for a first coverage enhancement associated with the RACH procedure, wherein the request includes information related to a second coverage enhancement associated with an acknowledgement associated with the RACH procedure, wherein the information related to the second coverage enhancement corresponds to a request for the second coverage enhancement or a capability indication related to the second coverage enhancement, wherein the first coverage enhancement corresponds to a repetition request for a radio resource control (RRC) connection request message, wherein the second coverage enhancement corresponds to a repetition request for an RRC connection setup message; and
outputting a random access response associated with the RACH procedure.

25. The method of claim 24, wherein the information related to the second coverage enhancement comprises the request for the second coverage enhancement or the capability indication related to the second coverage enhancement.

26. The method of claim 24, wherein the second coverage enhancement comprises repetition of a physical uplink control channel (PUCCH) associated with the acknowledgement.

\* \* \* \* \*